United States Patent [19]
Nezu et al.
[11] 3,710,326
[45] Jan. 9, 1973

[54] PREFERENTIAL OFFERING SIGNAL PROCESSING SYSTEM

[75] Inventors: Kazuo Nezu; Yutaka Tochitani, both of Tokyo, Japan

[73] Assignee: Yokogawa Electric Works, Ltd., Tokyo, Japan

[22] Filed: June 12, 1970

[21] Appl. No.: 45,729

[52] U.S. Cl.....................340/172.5
[51] Int. Cl.....................G06f 9/00
[58] Field of Search....................340/172.5

[56] References Cited

UNITED STATES PATENTS

| | | | |
|---|---|---|---|
| 3,456,244 | 7/1969 | Seichter et al | 340/172.5 |
| 3,509,539 | 4/1970 | Fichten et al | 340/172.5 |
| 3,396,372 | 8/1968 | Calvert | 340/172.5 |
| 3,512,133 | 5/1970 | Bennett et al. | 340/172.5 |
| 3,539,998 | 11/1970 | Belcher et al. | 340/172.5 |

*Primary Examiner*—Paul J. Henon
*Assistant Examiner*—Ronald F. Chapuran
*Attorney*—Chittick, Pfund, Birch, Samuels & Gauthier

[57] ABSTRACT

A system for feeding offering (input) signals from a plurality of groups of offering (input) terminals to a CPU. A control circuit is associated with each terminal and these control circuits are divided into groups corresponding to the terminal. The groups of control circuits are selectively fed select signals and the CPU sends out polling signals sequentially to the control circuits of each group. Each of the control circuits contains an AND circuit which is enabled to pass a signal to the CPU when its control circuit receives a polling and a select signal along with an offering signal at its associated terminal.

8 Claims, 2 Drawing Figures

INVENTORS
KAZUO NEZU
YUTAKA TOCHITANI

BY Chittick, Pfund, Birch, Samuels and Gauthier

INVENTORS
KAZUO NEZU
YUTAKA TOCHITANI

BY Christie, Parker, Hale, Samuels & Gauthier
ATTORNEY

PREFERENTIAL OFFERING SIGNAL PROCESSING SYSTEM

BACKGROUND OF THE INVENTION

This invention relates to a preferential offering signal processing system for a digital operating and processing apparatus wherein a plurality of offering signals are processed according to an order of preference.

In digital operating and processing apparatus adapted to compute the actual time of physical phenomena by introducing information regarding the phenomena directly into the computor, there are provided a plurality of offering mechanisms for the purpose of rapidly transmitting data to the computor from the external devices.

In the prior art, since each offering terminal is assigned with a particular designating code it is necessary to provide one decoder circuit for each offering terminal. An increased number of offering terminals requires a larger number of decoder circuits thus not only complicating the circuit construction and increasing the manufacturing cost but also decreasing reliability.

SUMMARY OF THE INVENTION

It is an object of this invention to provide a novel system which can readily process a plurality of offering signals with a simple circuit construction.

According to the invention, a system for feeding offering (or input) signals from a plurality of groups for offering (or input) terminals to a receiving device is provided. Each terminal has associated therewith a control circuit which is responsive to an offering (or input) signal at its associated terminal. The control circuits are divided into groups corresponding to their associated input terminals. Select signals are selectively sent to the groups of control circuits and polling signals are sequentially sent to the control circuits of each group. A gate circuit is contained within each control circuit and each gate circuit passes a signal to the receiving device in response to its control circuit receiving a polling and a select signal and an input signal at its associated terminal.

Preferably, each control signal is sent to a control circuit in each different group and each select signal is only sent to one group of control circuits.

BRIEF DESCRIPTION OF THE DRAWING

The invention can be more fully understood from the following description when taken in conjunction with the accompanying drawing in which.

DESCRIPTION OF THE PREFERRED EMBODIMENT

Figure 1:
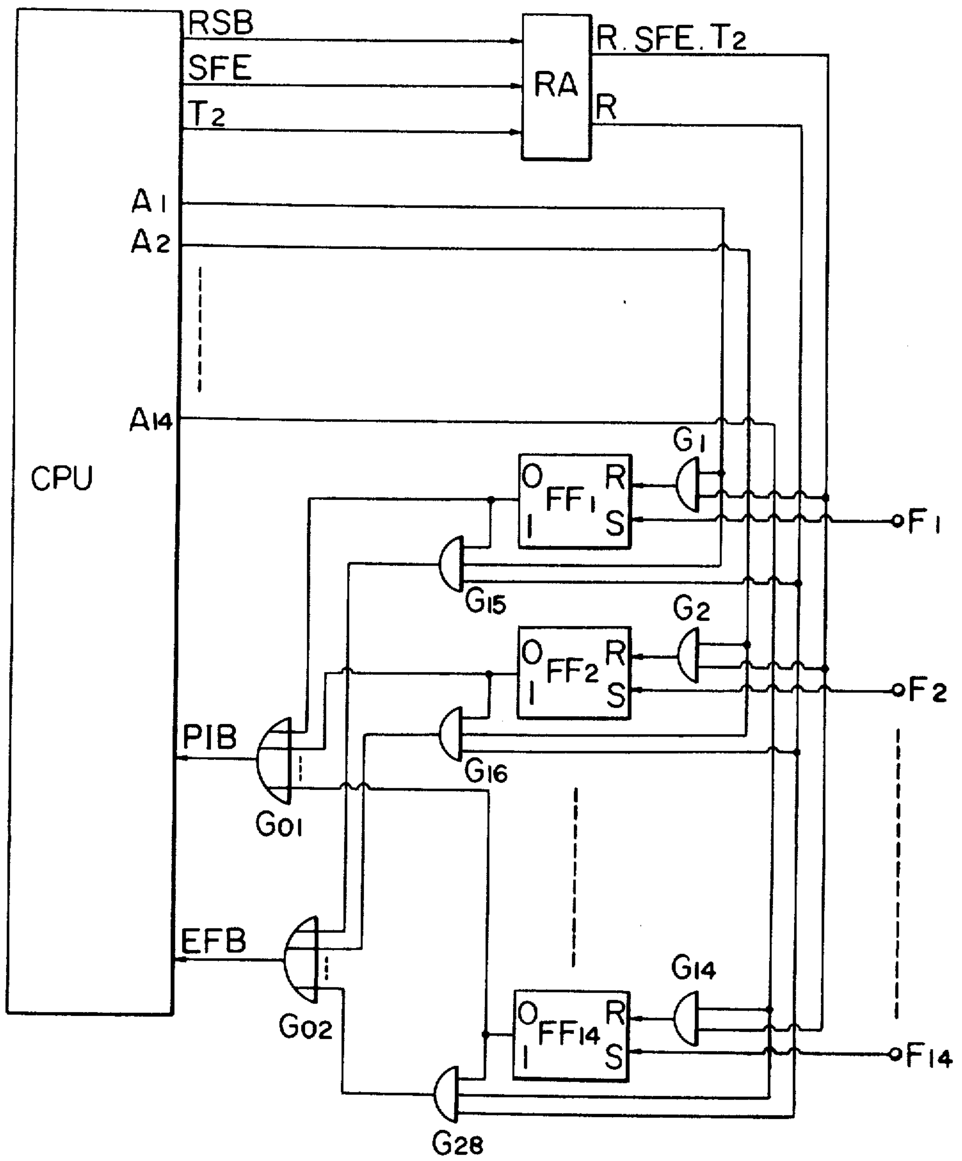
FIG. 1 is a block diagram of a preferential offering signal processing system embodying this invention and FIG. 2 shows waveforms to explain the operation of the system shown in FIG. 1.

The preferential offering signal processing system shown in FIG. 1 comprises a digital operating and processing device CPU including an offering signal input terminal PIB, an answer back signal input terminal EFB, offering terminal interrogating signal output terminals $A_1$ through $A_{14}$ and offering group selecting signal output terminals RSB, SFE and $T_2$. Offering signals are applied to terminals $F_1$ through $F_{14}$. Flip-flop circuits $FF_1$ through $FF_{14}$ are provided to receive and store offering signals to provide signals for the operating and processing device CPU to inform it of occurrence of the offering signals. Connected to terminals RSB, SFE and $T_2$ is decoder circuit RA to receive offering group selecting signals generated by the operating and processing device CPU so as to generate an enabling select signal R and a reset signal $R.SFE.T_2$ when the interrogation process of the offering terminals in the group which have received offering signals has completed and the offering signals are received by the operating and processing device CPU. Associated with the flip-flop circuits are AND gate circuits $G_1$, $G_2$ through $G_{14}$, $G_{15}$ and $G_{16}$ through $G_{28}$ and OR gate circuits $G_{01}$ and $G_{02}$.

Offering signal input terminals $F_1$ through $F_{14}$ are connected to respective set signal input terminals S of flip-flop circuits $FF_1$ through $FF_{14}$ corresponding to their suffixes, and the respective set signal output terminals 1 of respective flip-flop circuits $FF_1$ through $FF_{14}$ are connected to input terminals of respective AND gate circuits $G_{15}$ through $G_{28}$ and to the input terminals of OR gate circuit $G_{01}$. Respective output terminals of AND gate circuits $G_{15}$ through $G_{28}$ are connected to the input terminals of OR gate circuit $G_{02}$. The output terminal of OR gage circuit $G_{01}$ is connected to the offering signal input terminal PIB of the operating and processing device CPU while the output terminal of OR gate circuit $G_{02}$ is connected to the answer back signal input terminal EFB of the operating and processing device. The interrogating signal output terminals $A_1$ through $A_{14}$ are connected to the input terminals of AND gate circuits $G_1$ through $G_{14}$ and $G_{15}$ through $G_{28}$ corresponding to their suffixes. Signal output terminals RSB, SFE and $T_2$ of the operating and processing circuit CPU are connected to decoder circuit RA whose selector signal output terminal R is connected to the input terminals of AND gate circuits $G_{15}$ through $G_{28}$. The reset signal output terminal $R.SFE.T_2$ of the decoder circuit is connected to the input terminals of AND gate circuits $G_1$ through $G_{14}$.

It should be noted that FIG. 1, for the purpose of simplifying, shows only one group of offering terminals ($F_1$–$F_{14}$) whereas in actuality there usually are several groups providing input signals to the one CPU. Each such group comprises several terminals. Each of the groups has one code signal identifying the group itself. Each of groups is provided with one decoder circuit like RA, a plurality of offering terminals like $F_1$–$F_{14}$, and flip-flop circuits like $FF_1$–$FF_{14}$ and gate circuits like $G_1$–$G_{28}$ corresponding to each of offering terminals. Further, in FIG. 1, terminals RSB, SFE, $T_2$ and $A_1$–$A_{14}$ of the operating and processing device CPU are connected in common with corresponding terminals of the other offering groups which are not shown and offering signal input terminal PIB and answering back signal input terminal EFB are connected in common with an offering signal input terminal and an answering back signal terminal of each of offering groups, respectively.

Figure 2:
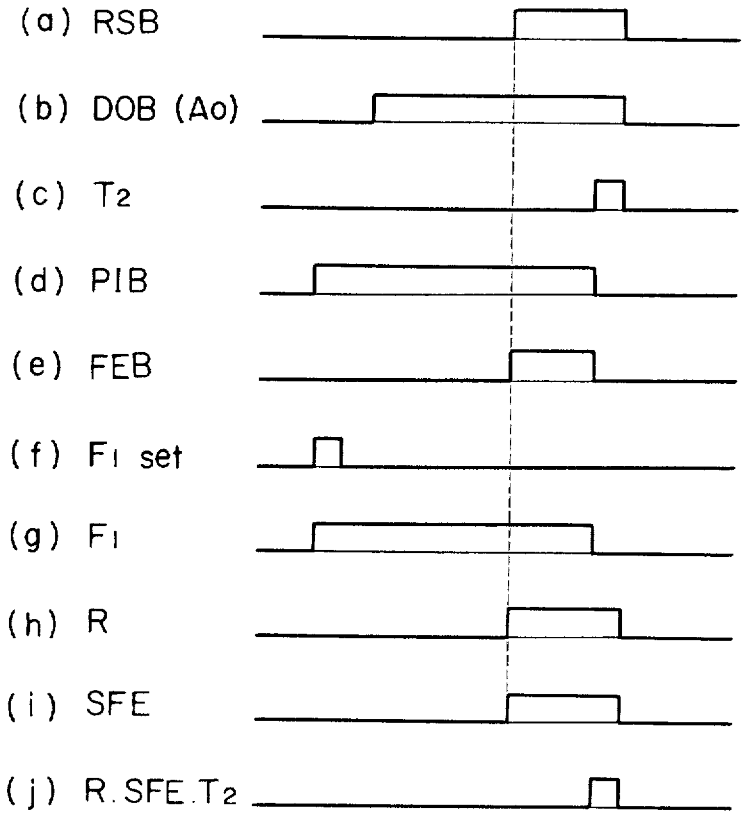

An illustrative explanation of the operation of the preferential offering signal processing system shown in FIG. 1 follows using the waveforms of FIG. 2:

Assuming that an offering signal (as in FIG. 2*f*) is applied to the offering signal input terminal $F_1$, the flip-flop circuit $FF_1$ is set to produce an output signal terminal as shown in FIG.2*g*. This signal is applied to the offering signal input terminal PIB of the operating and processing device CPU through OR gate circuit $G_{01}$ to produce an offering signal as shown in FIG.2*d*. When the operating and processing device CPU receives the offering signal at the offering signal input terminal PIB, the CPU interrupts its programed operation to initiate an interrogating operation of the particular offering terminals of the group which was supplied with the offering signal.

The operating and processing device CPU produces a pulse signal as shown in FIG. 2*b* successively at each of the offering signal output terminals $A_1$ through $A_{14}$ (which are used in common as data output terminals of the CPU so that gate circuits $G_1$ through $G_{14}$ are conditioned successively). Additionally, the operating and processing device CPU supplies a code signal as shown in FIG. 2*a* and *i* to the decoder circuit of each offering group. This code signal causes the particular decoder which is associated with the group of offering terminals having the offering signals to become operative. This decoder circuit RA associated with the proper group of offering terminals generates a selector signal as shown in FIG.2*h* on its selector signal output terminal R when it receives its own code signal from the CPU to supply the selector signal to AND gate circuits $G_{15}$ through $G_{28}$. Since the output of the flip-flop circuit $FF_1$ which has been set by the offering signal is set to a "1" AND gate circuit is enabled by the selector signal from terminal R of the decoder circuit RA to pass interrogating signals as shown in FIG. 2*b* generated at terminal $A_1$. As a result the pulse signal from interrogating signal output terminal $A_1$ corresponding to AND gate circuit $G_{15}$ which is enabled by the set signal from the flip-flop circuit of the flag are applied to the answer back signal input terminal EFB of the operating and processing device CPU through the enabled gate circuit and the OR gate circuit $G_{02}$.

Upon application of the signal upon the answer back signal input terminal EFB, a $T_2$ pulse as shown in FIG. 2C is sent out through interrogation signal output terminal $T_2$ of the operating and processing device CPU. The $T_2$ pulse is applied to the decoder circuits in each of offering terminal groups. At this time, the decoder circuit RA associated with the proper offering terminal group and which has been supplying the selector signal from its selector signal output terminal R provides a reset signal R.SFE. $T_2$ as shown in FIG. 2J. This reset signal will be supplied to the reset signal input terminal of the flip-flop circuit $FF_1$ through AND gate $G_1$. Since AND gate $G_1$ is now receiving a signal from terminal $A_1$, it now resets the flip-flop circuit $FF_1$ and the operation of interrogating the offering terminals is terminated.

When the answer back signal is impressed upon terminal EFB, the operating and processing device CPU determines which one of the terminals of the group of the offering terminals has been applied with an offering signal by the action of the code signal applied upon decoder circuit RA and pulse signals supplied from the interrogation of output terminals $A_1$ through $A_{14}$, thus performing the offered program corresponding to that offering terminal.

In the case where no offering signal is impressed on the terminal $F_1$ of the offering terminal group shown in FIG. 1 an answer back signal is not generated during the time that an output signal is supplied from the terminal $A_1$ of the operating and processing device CPU. In such a case, the CPU stops providing a signal from the terminal $A_1$ and initiates an output signal from the terminal $A_2$. In the same manner as described above, the CPU supplies a code signal to the decoder circuit in each of offering terminal groups successively and checks whether or not the terminal $F_2$ of each of offering terminal groups is supplied with an offering signal. In such a manner, the operating and processing device CPU checks each of the offering terminal groups by supplying successively a signal to the terminals $A_1$ through $A_{14}$ to detect an existing offering signal.

The order of preference assigned to the offering signals is determined by the order of selecting the groups of offering terminals and the order of sending interrogating signals from terminals $A_1$ through $A_{14}$. Since the order of sending these two signals can be set by a program the order of preference assigned to the offering signals can be readily set by the program.

Thus this invention provides a novel preferential offering signal processing system of a simple construction and capable of processing a number of offering signals.

What is claimed is:

1. In a system for feeding input signals to a receiving device from a plurality of groups of input terminals through gating circuits respectively associated with the groups of input terminals by enabling said gating circuits with select and polling signals and disabling said gating circuits with reset signals, the improvement where each said gating circuit comprises:

a plurality of bistable circuits respectively associated with the input terminals associated with said gating circuit, each said bistable circuit being connected to its associated input terminal for storing an input signal at said terminal;

a plurality of first gates, each of which is connected to the output of an associated bistable circuit and adapted to pass a signal stored therein upon receiving a polling and a select signal; and, a plurality of second gates, each of which is connected for resetting an associated bistable circuit in response to a polling and a reset signal.

2. The system as recited in claim 1 wherein each said gating circuit further comprises:

an OR circuit connected to the outputs of each said bistable circuit in said gating circuit and whose output is connected to said receiving device for signalling said receiving device of the occurrence of an input signal at one of the terminals associated with said gating circuit.

3. The system as recited in claim 1 wherein each said gating circuit further comprises:

an OR circuit connected for receiving the outputs of said first gates in said gating circuit and for passing said outputs to said receiving device.

4. The system as recited in claim 2 wherein the outputs of said OR circuits in said plurality of gating circuits are connected in common as an input to said receiving device.

5. The system as recited in claim 3 wherein the outputs of said OR circuits in said plurality of gating circuits are connected in common as an input to said receiving device.

6. The system as recited in claim 4 wherein said select signals are successively fed to said gating circuits as inputs to their first gates in response to a signal at said common input of said receiving device.

7. The system as recited in claim 4 where said polling signals are successively fed to the first and second gates associated with the plurality of bistable circuits in each of said gating circuits in response to a signal at said common input of said receiving device.

8. The system as recited in claim 5 wherein said second gates in each said gating circuit are fed a reset signal in response to a signal at said common input of said receiving device.

* * * * *